(12) United States Patent
Hsieh et al.

(10) Patent No.: US 11,537,518 B2
(45) Date of Patent: Dec. 27, 2022

(54) CONSTRAINING MEMORY USE FOR OVERLAPPING VIRTUAL MEMORY OPERATIONS

(71) Applicant: Adobe Inc., San Jose, CA (US)

(72) Inventors: Chih-Yao Hsieh, San Jose, CA (US); Zhaowen Wang, San Jose, CA (US)

(73) Assignee: Adobe Inc., San Jose, CA (US)

( * ) Notice: Subject to any disclaimer, the term of this patent is extended or adjusted under 35 U.S.C. 154(b) by 552 days.

(21) Appl. No.: 15/716,050

(22) Filed: Sep. 26, 2017

(65) Prior Publication Data
US 2019/0095326 A1 Mar. 28, 2019

(51) Int. Cl.
*G06F 12/0804* (2016.01)
*G06F 9/50* (2006.01)
*G06F 12/0846* (2016.01)

(52) U.S. Cl.
CPC ........ *G06F 12/0804* (2013.01); *G06F 9/5016* (2013.01); *G06F 9/5066* (2013.01); *G06F 12/0848* (2013.01)

(58) Field of Classification Search
None
See application file for complete search history.

(56) References Cited

U.S. PATENT DOCUMENTS

| | | | | |
|---|---|---|---|---|
| 4,685,125 | A * | 8/1987 | Zave | G06F 9/4843 700/1 |
| 5,727,178 | A * | 3/1998 | Pletcher | G06F 9/5016 711/163 |
| 7,653,797 | B1 * | 1/2010 | Phillips | G06F 12/0261 711/133 |
| 8,669,987 | B2 * | 3/2014 | Redshaw | G06T 1/60 345/443 |
| 2004/0160449 | A1 * | 8/2004 | Gossalia | G06F 9/5016 345/543 |
| 2006/0253498 | A1 * | 11/2006 | Barrs | G06F 12/0269 |
| 2007/0110389 | A1 * | 5/2007 | Hayashi | G11B 27/3027 386/283 |
| 2009/0228124 | A1 * | 9/2009 | Kato | H04N 5/765 700/94 |
| 2010/0149199 | A1 * | 6/2010 | Jacoby | G06F 9/5016 345/541 |

(Continued)

*Primary Examiner* — Meng Ai T An
*Assistant Examiner* — Zujia Xu
(74) *Attorney, Agent, or Firm* — FIG. 1 Patents (57) ABSTRACT

Constraining memory use for overlapping virtual memory operations is described. The memory use is constrained to prevent memory from exceeding an operational threshold, e.g., in relation to operations for modifying content. These operations are implemented according to algorithms having a plurality of instructions. Before the instructions are performed in relation to the content, virtual memory is allocated to the content data, which is then loaded into the virtual memory and is also partitioned into data portions. In the context of the described techniques, at least one of the instructions affects multiple portions of the content data loaded in virtual memory. When this occurs, the instruction is carried out, in part, by transferring the multiple portions of content data between the virtual memory and a memory such that a number of portions of the content data in the memory is constrained to the memory that is reserved for the operation.

20 Claims, 8 Drawing Sheets

(56) References Cited

U.S. PATENT DOCUMENTS

| | | | |
|---|---|---|---|
| 2012/0221805 A1* | 8/2012 | Hjul | G06F 12/023 711/154 |
| 2015/0012720 A1* | 1/2015 | Tanba | G06F 3/0604 711/171 |
| 2016/0284072 A1* | 9/2016 | Hsu | G06T 11/60 |
| 2018/0276042 A1* | 9/2018 | Toal | G06F 11/3037 |

* cited by examiner

CONSTRAINING MEMORY USE FOR OVERLAPPING VIRTUAL MEMORY OPERATIONS

BACKGROUND

In general, virtualization technologies have decoupled physical hardware resources, involved in storing information for immediate use in a computer (e.g., random-access memory (RAM)), from memory addresses used by computer applications. Due to the decoupling, capabilities of different computing-device resources, such as RAM and hard drives, can be aggregated. This aggregation allows operating systems, or applications running thereon, to leverage the aggregated resources as memory—referred to as "virtual memory." The operating systems and applications can access these resources aggregated as the virtual memory in a way that extends the capabilities of the physical resources. For instance, the aggregated resources' address space can exceed the capacity of physical memory, e.g., RAM. Based on this, computing devices that implement virtual memory increase an amount of memory available for reference by applications.

Conventional techniques for processing data using virtual memory involve allocating virtual memory to the data being processed. To perform an operation on an image, for instance, an amount of the virtual memory corresponding to a size of the image is allocated. These techniques also involve copying data from the virtual memory to physical memory to carry out the operation. In some scenarios, multiple processes may attempt to utilize the physical memory simultaneously. In addition or alternately, these techniques may involve copying to the physical memory portions of data loaded into allocated virtual memory, even though the virtual memory allocated to the data exceeds the amount of physical memory available for processing the data. In such scenarios, requests for memory—use of the physical memory—can exceed an operating threshold. When this occurs, these conventional techniques may terminate the application or process making the request. From a user's standpoint, the application or process "crashes." When an application crashes, there can be a variety of undesirable effects, such as loss of unsaved changes made to content, consumption of a user's time (waiting for the application to completely shut down and/or reboot so that it is again usable), a hampered experience for the user, and so forth.

SUMMARY

To overcome these problems, memory use is constrained for overlapping virtual memory operations in a digital medium environment. The memory use is constrained to prevent memory from exceeding an operational threshold, which can cause applications and/or processes of a computing device to "crash." Broadly speaking, the memory use is constrained in relation to operations for modifying content. These operations are implemented according to algorithms having a plurality of instructions. Before the instructions are performed in relation to the content, virtual memory is allocated to the content data, which is then loaded into the virtual memory. The content data in the virtual memory is also partitioned into data portions. In the context of the described techniques, at least one of the instructions affects multiple portions of the content data loaded in virtual memory. When this occurs, the instruction is carried out, in part, by transferring the multiple portions of content data between the virtual memory and a memory such that a number of portions of the content data in the memory is constrained to the memory that is reserved for the operation.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Virtualization technologies have enabled capabilities of different physical computing device resources to be aggregated, such as to implement virtual memory. These resources aggregated as virtual memory extend the capabilities of individual physical resources. For instance, the aggregated resources' address space can exceed the capacity of physical memory, e.g., random-access memory (RAM). Accordingly, computing devices that implement virtual memory increase an amount of memory available for reference by applications. However, conventional techniques for processing data using virtual memory may suffer from a host of problems. In general, these problems occur in connection with requests for memory—use of the physical memory—that exceed an operating threshold.

In response to such requests, these conventional techniques may terminate an application or process making the request. From a user's standpoint, the application or process "crashes" as a result. Such crashing can cause a variety of undesirable effects, such as loss of unsaved changes made to content, consumption of a user's time (waiting for the application to completely shut down and/or reboot so that it is again usable), a hampered experience for the user, and so forth. Further, this crashing occurs in scenarios where applications or processes access the virtual memory in an "overlapped" pattern, e.g., due to operating-system design, components of the operating system are configured to load data from the virtual memory into heap memory strip of data by strip of data. By way of example, these accesses correspond to reading the strips of data from the virtual memory and loading the data into the heap memory in RAM. Due to the overlapped access pattern, the operating system does not release the heap memory because the virtual memory continues to be used.

To overcome these problems, memory use is constrained for overlapping virtual memory operations in a digital medium environment. The memory use is constrained to prevent memory from exceeding the operational threshold. Broadly speaking, the memory use is constrained in relation to operations involving "overlapped" virtual memory access patterns for modifying content, such as operations for modifying images, videos, audio, documents, neural networks, video or audio streams, and so forth. In particular, the described techniques constrain memory use (e.g., heap memory) in relation to operations that overlap multiple portions of content data loaded into virtual memory as described herein.

In one or more implementations, a request is received to perform a modification operation on an item of digital content, e.g., a particular image or video. In general, such modification operations are carried out according to a content operation algorithm having multiple instructions. In accordance with the described techniques, a virtual memory manager allocates virtual memory to the content being modified by the operation. Once the virtual memory is allocated, the virtual memory manager loads data corresponding to the content into the allocated virtual memory. This content data as loaded in the virtual memory is partitioned to portions, as described below.

In the context of the described techniques, at least one of the instructions of the content operation algorithm affects multiple portions of the content data that is loaded in the virtual memory. An example of this is an instruction to apply a blurring filter in relation to a pixel of an image. Oftentimes, blurring filters have a radius corresponding to some number of pixels from a reference pixel. Accordingly, application of the blurring filter affects multiple pixels even though application is centered on the reference pixel. When the blurring filter applies to pixels represented by multiple different portions of the image data in virtual memory, the example instruction is considered to affect multiple different portions of content data loaded in virtual memory.

When an instruction affects multiple portions of content data in the virtual memory, the instruction is carried out, in part, by the virtual memory manager transferring the multiple portions between the virtual memory and the memory such that a number of portions of content data in the memory is constrained to the memory reserved for the operation. To constrain the content data, the virtual memory manager determines whether transfer of a portion of content data to the memory will exceed the reserved portion of the memory. If the virtual memory manager determines that the transfer will not result in exceeding the reserved portion of memory, then the virtual memory manager simply reads the corresponding portion of content data from the virtual memory and writes this portion of content data to the reserved portion of memory. If the virtual memory manager determines that the transfer will result in exceeding the reserved portion of memory, however, then the virtual memory manager instead swaps the corresponding portion of data with a portion of content data already in the reserved portion of memory.

By constraining content modification operations in this way, the virtual memory manager prevents data from being loaded into memory and exceeding its operating threshold. Due to keeping the memory usage below the operational threshold, the described techniques reduce a frequency with which applications and processes are terminated. Accordingly, applications and processes leveraging the described techniques crash less than those that leverage conventional techniques for processing data using virtual memory. The undesirable effects of "crashing" are also therefore reduced or avoided by implementing the described techniques. These techniques are particularly advantageous in scenarios where memory is limited, such as in connection with content modification performed by mobile devices, e.g., mobile phones, dedicated digital cameras, dedicated digital camcorders, dedicated audio recorders, tablet devices, computing watches, and so forth.

Term Descriptions

As used herein, the term "content" refers to a variety of digital media comprising underlying data which can be maintained in storage (e.g., hard disk drives) and is capable of being modified by one or more operations. Some examples of content include digital images, videos, audio, documents, neural networks, video or audio streams, and so forth.

As used herein, the term "operation" generally refers to a series of instructions that can be carried out using functionality of a computing device, e.g., to modify content. Example operations for modifying content include image blurring operations, image filtering operations, content compression algorithms, video filtering operations, audio filtering operations, and so on. A variety of other operations can be leveraged for modifying content without departing from the spirit or scope of the techniques described herein.

As used herein, the term "overlapping" refers to a characteristic of an operation or of an instruction of an operation to affect multiple portions of data, namely, multiple portions of content data in a virtual memory. In one or more implementations, the content data loaded into virtual memory is partitioned into portions such that each of the portions includes an amount of data indicative of respective content. An "overlapping" instruction or operation applies to the content data of two or more of the portions. An example of an overlapping instruction is an instruction to apply a blurring filter in relation to a reference pixel of an image where the blurring filter has a radius that affects pixels represented by data in two or more portions of image data. Another example of such an instruction is an instruction to apply video compression to a reference frame of a video where such application also involves accessing preceding and succeeding frames in two or more portions of the video data.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

Figure 1:
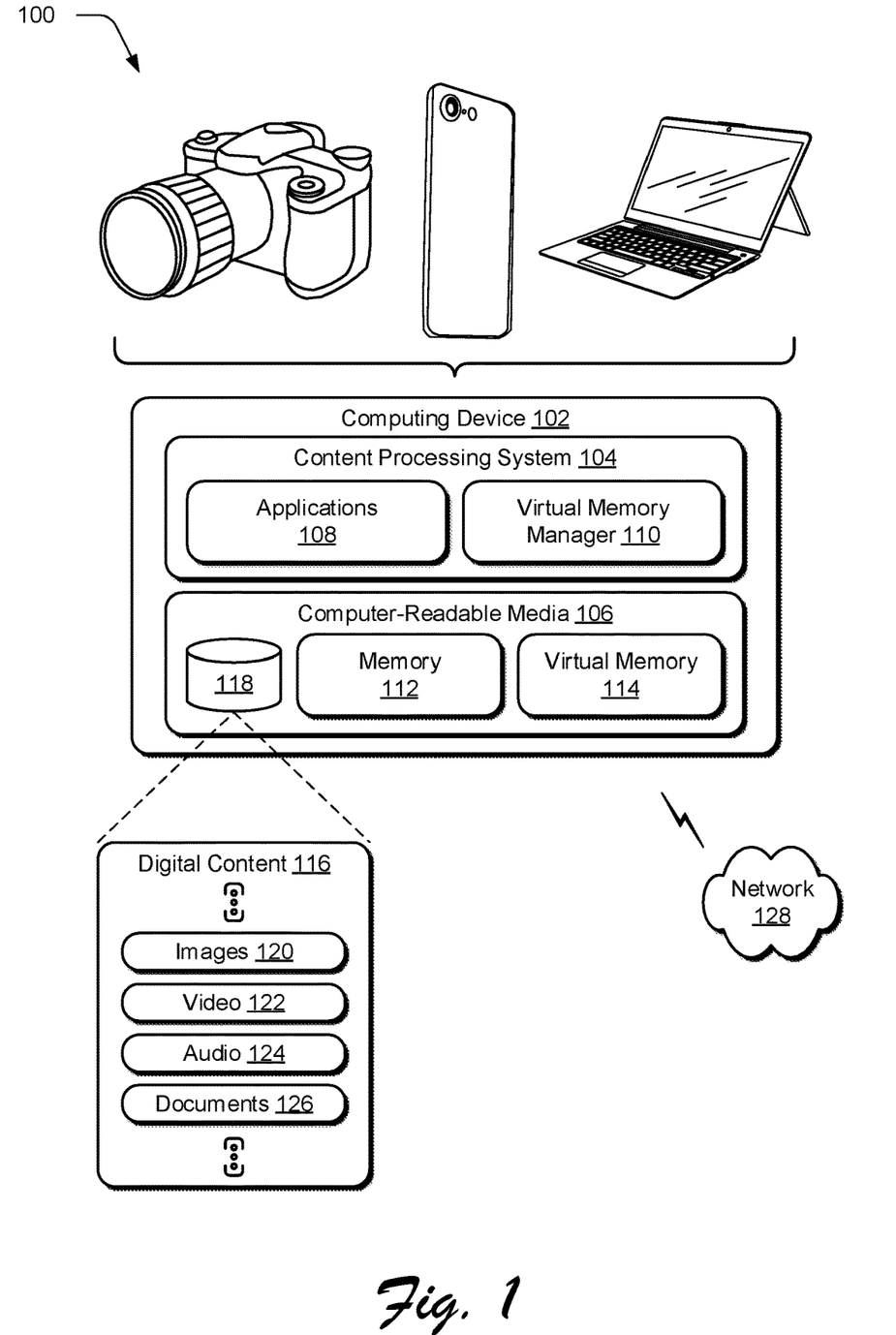
FIG. 1 is an illustration of an environment in an example implementation that is operable to employ techniques described herein.

FIG. 1 is an illustration of a digital medium environment 100 in an example implementation that is operable to employ techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 6.

The illustrated computing device 102 includes content processing system 104 and computer-readable media 106. The content processing system 104 is further depicted including applications 108 and virtual memory manager 110, which are implemented at least partially in hardware of the computing device 102, such as by using one or more processing devices (e.g., processors) of the content processing system 104. The illustrated computing device 102 also includes memory 112 and virtual memory 114. The memory 112 and the virtual memory 114 are depicted as being included in the computer-readable media 106. The illustrated example 100 also includes digital content 116, which is illustrated in storage 118.

The digital content 116 may assume a variety of forms, such as images 120, video 122, audio 124, documents 126, and so forth. Indeed, the digital content 116 may assume a variety of other forms without departing from the spirit or scope of the techniques herein. Additionally, the digital content 116 may be generated at the computing device 102, such as using one of the applications 108. The digital content 116 may also represent content obtained by the computing device 102 in other ways, e.g., communicated to the computing device 102 from another computing device over network 128. In general, the digital content 116 represents data that can be modified by leveraging functionality of the memory 112 and the virtual memory 114 according to the described techniques.

In general, the memory 112 represents at least one hardware device—physical memory—configured to store data for immediate use in the computing device 102. Examples of physical devices that can be used for the memory 112 include random-access memory (RAM), central processing unit (CPU) cache memory, and so on. These types of devices are distinguishable from "storage," which generally provides program and data storage access at slower speeds than physical memory but has a higher capacity than physical memory. In the context of the described techniques, the memory 112 represents functionality to have data of the digital content 116 written thereto, modified (e.g., in connection with a content-modification operation), and then read therefrom. By way of example, portions of an image 120 can be written to the memory 112, modified (e.g., in connection with an image blurring operation), and then read from the memory 112. The portions of the example image 120 read from the memory 112 after the modification can be copied back to the image 120 in the storage 118. In so doing, the modifications made in accordance with the blurring operation can be maintained.

In contrast to the memory 112, the virtual memory 114 represents an aggregation of different physical resources of the computing device 102, such as a portion of the memory 112, a portion of the storage 118, and/or a portion of other resources of the computing device 102. These different physical resources are aggregated and configured to function as memory for the computing device 102, e.g., for use by the applications 108 and/or an operating system of the computing device 102. The virtual memory manager 110 represents functionality, in part, to aggregate the physical resources and configure them as the virtual memory 114. The virtual memory manager 110 may implement the virtual memory 114 by leveraging one or more virtualization techniques.

Broadly speaking, though, the virtual memory manager 110 represents functionality to manage the virtual memory 114. The illustrated virtual memory manager 110 is implemented at least partially in hardware of the computing device 102 to manage the virtual memory 114. Although illustrated as implemented locally at the computing device 102, functionality of the illustrated virtual memory manager 110 may also be implemented in whole or part via functionality available via the network 128, such as part of a web service or "in the cloud."

Virtual memory management includes exposing the virtual memory 114 for use by the applications 108, e.g., so that the applications 108 can leverage the virtual memory 114 for content processing operations. Virtual memory management also includes carrying out acts for moving the digital content 116 (or portions thereof) between the storage 118, the memory 112, and the virtual memory 114. In particular, the virtual memory manager 110 is configured to carry out these acts so that modification operations can be performed in relation to the digital content 116. These acts include, but are not limited to, the virtual memory manager 110 allocating the virtual memory 114, loading content data to the allocated virtual memory 114, reading portions of the data from the virtual memory 114, writing the read portions to the memory 112, modifying the portions of data in the memory 112 according to a modification operation invoked by one of the applications 108, reading the modified data from the memory 112, and writing the read modified data back to the virtual memory 114. In this way, content loaded into the virtual memory 114 can be modified and the modifications saved or otherwise maintained.

In accordance with the described techniques, the virtual memory manager 110 also represents functionality to partition the data loaded into the virtual memory 114 into portions of data having a defined size. For example, the virtual memory manager 110 may partition an image 120 loaded into the virtual memory 114 into a plurality of 20-megabyte portions. Further, the virtual memory manager 110 is configured to reserve space in the memory 112 for handling content modification operations. In one or more implementations, the virtual memory manager 110 reserves, for an operation, an amount of space of the memory 112 that corresponds to a number of the portions. In connection with an image editing operation, for example, the virtual memory manager 110 may reserve five portions worth of space in the memory 112. In the continuing example, where the virtual memory manager 110 divides the image into 20-megabyte portions, the virtual memory manager 110 thus reserves 100 megabytes of the memory 112 for the example image editing operation. The virtual memory manager 110 reads and writes the partitioned content data between the virtual memory 114 and the memory 112 to carry out operations. Accordingly, the virtual memory manager 110 in the continuing example thus reads and writes the 20-megabyte portions of image data between the virtual memory 114 and the memory 112 to carry out an image editing operation.

In general, the described techniques manage the memory 112 and the virtual memory 114 in connection with handling content operations that "overlap" multiple portions of the data in the virtual memory 114. By "overlap," it is meant that an algorithm used to carry out the operation is performed on at least two portions of the data—the operation is performed on a first and at least a second portion of the data such that the operation crosses boundaries of the portions as defined by the portion size. As one example, consider an image blurring operation that involves incrementally processing each pixel of the image and modifying pixels within a varying radius of a current pixel under consideration. In this example, assume also that the entire image is loaded into the virtual memory 114, the virtual memory manager 110 reserves a 60-megabyte space in the memory 112, and the virtual memory manager 110 partitions the image into a multitude of 20-megabyte portions.

In this context, consider a scenario in which a pixel corresponding to data at or near an end of a particular portion is processed according to the image blurring operation. In this scenario, the radius for modifying other pixels may extend beyond a boundary of the particular portion and into a different portion, e.g., to modify the pixels of the different portion. In this scenario, the virtual memory manager 110 reads this different portion from the virtual memory 114 and writes this different portion to the memory 112. Once the different portion is written to the memory 112, the image blurring operation is carried out on the different portion's data to modify the pixels corresponding to the different portion. The virtual memory manager 110 swaps portions of content data between the virtual memory 114 and the memory 112 such that a maximum number of portions in the memory 112 in connection with an operation is constrained to the number reserved for the operation.

Unlike conventional techniques, the virtual memory manager 110 in connection with overlapping operations prevents data from being loaded into the memory 112 in a way that exceeds the memory 112's operational threshold. This is because an amount of the memory 112 used to carry out an operation is constrained by the virtual memory manager 110. Rather than writing portions of data to the memory 112 continuously, e.g., to carry out an operation that overlaps multiple portions, the virtual memory manager 110 swaps portions into and out of the memory 112 up to the reserved number. Due to keeping the memory usage below an operational threshold, the described techniques reduce a frequency with which applications and processes are terminated. An advantage of this is that applications and processes leveraging the described techniques crash less than those that leverage conventional techniques for processing data using virtual memory. Consequently, the undesirable effects of "crashing" are avoided with the described techniques. Operation of the virtual memory manager 110 to manage use of the memory 112 in connection with operations that overlap multiple data portions is described in greater detail in relation to FIG. 2 in the following description and as shown in the corresponding implementation example of FIG. 3.

Constraining Memory Use for Overlapping Virtual Memory Operations

Figure 2:
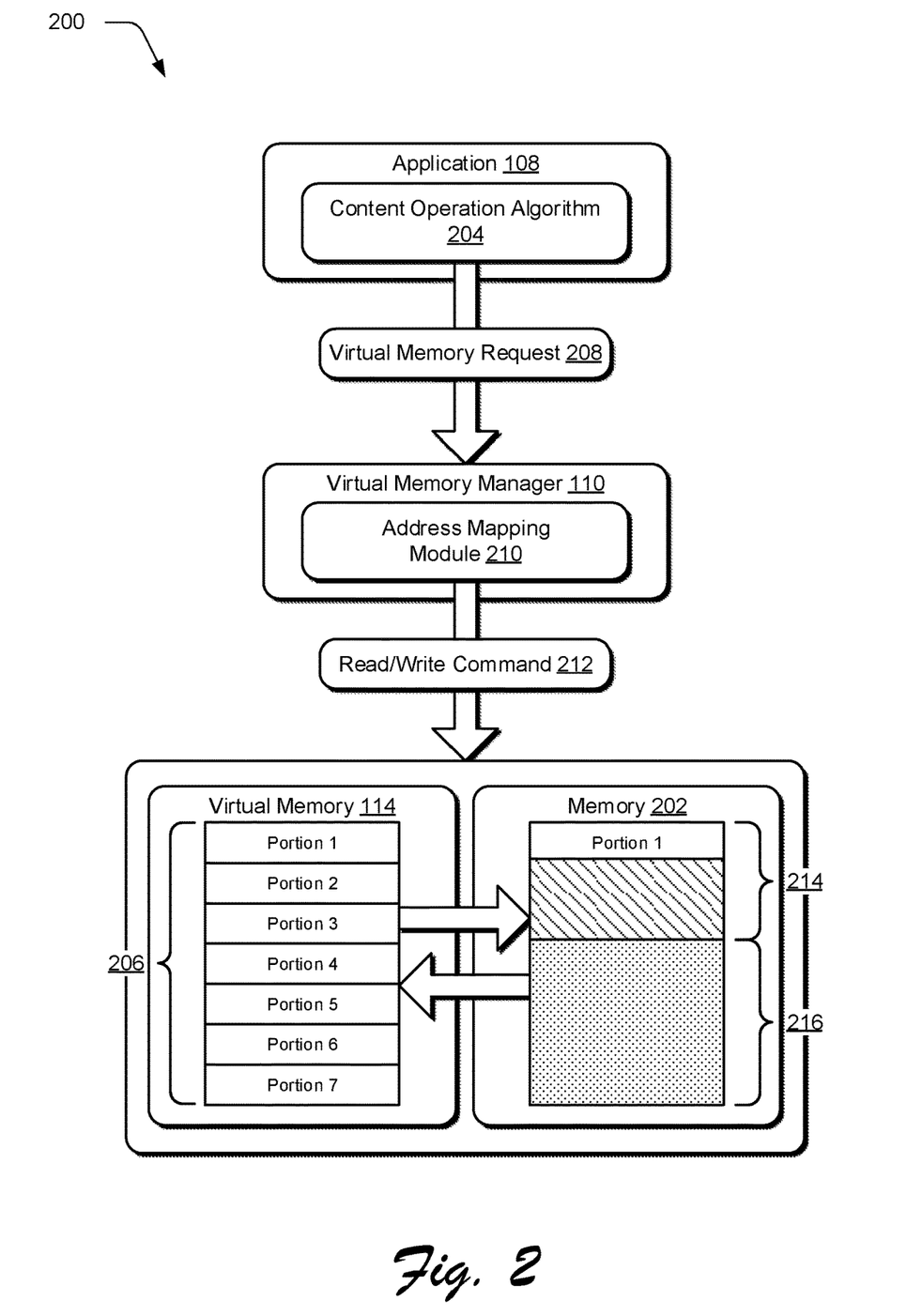
FIG. 2 depicts an example implementation in which a content processing system of FIG. 1 manages memory use to perform an operation that overlaps multiple portions of content data loaded in virtual memory.

FIG. 2 depicts an example implementation in which a content processing system of FIG. 1 manages memory use to perform an operation that overlaps multiple data portions of content loaded in virtual memory. The illustrated example 200 includes from FIG. 1 one of the applications 108, the virtual memory manager 110, and the virtual memory 114.

The illustrated example 200 also includes memory 202. In one or more implementations, the memory 202 corresponds to the memory 112. In addition or alternately, the memory 202 is another virtual memory. The memory 202 can be configured in a variety of ways to serve as computing memory without departing from the spirit or scope of the techniques described herein.

In accordance with the described techniques, consider content operation algorithm 204 and content 206, which is depicted partitioned into portions 1-7. In this example, the content 206 is the subject of the content operation algorithm 204. In other words, the content 206 is the data being modified according to the content operation algorithm 204. The illustrated portions represent that the content 206 is partitioned into portions having a defined size, e.g., portions 1-6 have a same size and portion 7 may represent a remainder of the content 206's data. Consider an example in which the content 206 is 132 megabytes and a portion size is 20 megabytes. In this example, portions 1-6 of the content 206 may each be formed as 20-megabyte portions and, because there are only 12 megabytes remaining, the seventh portion of the content 206 is configured as a 12-megabyte portion.

In any case, the content 206 may correspond to any of a variety of content types without departing from the spirit or scope of the described techniques. For example, the content 206 may be configured as an image, video, audio, document, neural network, video or audio stream, or a different type not specifically enumerated herein. Accordingly, the content operation algorithm 204 represents an algorithm that is executable to perform an operation on a respective content type to modify the data of the content. In one example, the content operation algorithm 204 may be configured to perform an image modification operation such that the content 206 corresponds to an image. Nonetheless, the content 206 may represent another type of content such that the content operation algorithm 204 represents an algorithm for performing a modification operation on the other type.

In the context of the described techniques, the content operation algorithm 204 involves, at some point, operating on at least two portions of the content 206 in the memory 202, e.g., operating on portions 1-3 of the content 206. To this extent, the content operation algorithm 204 is considered to implement an "overlapping" virtual memory operation. Before the content operation algorithm 204 is executed in relation to the content 206, however, the virtual memory manager 110 allocates the virtual memory 114 for the respective operation. This involves the virtual memory manager 110 initially receiving an indication that the content 206 is the subject of the content operation algorithm 204. The virtual memory manager 110 determines a size (e.g., in bytes) of the content 206 and allocates a corresponding amount of the virtual memory 114 for performing the respective operation on the content 206. Once the virtual memory 114 is allocated, the virtual memory manager 110 loads the content 206 into the allocated virtual memory 114. After the content 206 is loaded into the virtual memory 114, the virtual memory manager 110 controls reading and writing of data between the virtual memory 114 and the memory 202. In particular, this reading and writing of data is performed to carry out the operation implemented using the content operation algorithm 204.

In the illustrated example, the virtual memory manager 110 is configured to control the reading and writing of data based on virtual memory request 208. The virtual memory request 208 represents an instruction or instructions to perform some portion of the content operation algorithm 204 on data of the content 206 loaded in the virtual memory 114. In a scenario where the content 206 corresponds to an image, for instance, the virtual memory request 208 may represent an instruction to perform a portion of the content operation algorithm 204 in relation to a pixel of the image. Based on the virtual memory request 208, the virtual memory manager 110 determines portions of the loaded content 206 to which the corresponding instructions apply. Returning to the image scenario, the virtual memory manager 110 determines which portion of the loaded content 206 includes the pixel relative to which the corresponding instruction is to be performed.

Address mapping module 210 represents functionality of the virtual memory manager 110 to determine the portions of the loaded content 206 to which the virtual memory request 208 applies. Broadly speaking, the address mapping module 210 is configured to map the data loaded into the virtual memory 114 to address spaces of the physical resources aggregated to form the virtual memory 114. By way of example, the address mapping module 210 is configured to map portion 1 of the content 206 to address space of the physical resources aggregated to form the virtual memory 114, such as address space of RAM and a hard drive when those resources are aggregated to form the virtual memory 114. This mapping enables the data loaded in the virtual memory 114 to be copied and written to the memory 202 so that the data can be modified in accordance with the content operation algorithm 204.

Read/write command 212 represents a specific instruction to read data corresponding to the content 206 from the virtual memory 114 and write the data to the memory 202. Alternately or in addition, the read/write command 212 represents an instruction to read data in the memory 202 and write the data to the virtual memory 114, e.g., data that has been modified in the memory 202 according to the content operation algorithm 204. An example of such a modification is modifying one or more color values (e.g., a red green blue (RGB) value) of a pixel. In general, the virtual memory manager 110 issues the read/write command 212 to control data transfer between the virtual memory 114 and the memory 202. The virtual memory manager 110 may configure the read/write command 212 based on information determined by the address mapping module 210, e.g., addresses of the data that is to be transferred from the virtual memory 114 to the memory 202 and/or addresses where data transferred from the memory 202 to the virtual memory 114 is to be written.

In the context of the described techniques, the memory 202 is illustrated with reserved memory 214 and remaining portions 216 of the memory 202. The reserved memory 214 represents a portion of the memory 202 that is reserved for carrying out the content operation algorithm 204. In accordance with the described techniques, the virtual memory manager 110 is configured to reserve the reserved memory 214 for the content operation algorithm 204. This limits the application 108 to performing operations of the content operation algorithm 204 on data in the reserved memory 214. In connection with the content operation algorithm 204, data is not written to the remaining portions 216 of the memory. The application 108 also does not perform operations of the content operation algorithm 204 on data in the remaining portions 216 of the memory 202. The remaining portions 216 of the memory 202 may be reserved as part of carrying out other operations or simply available to handle one or more operations.

Broadly speaking, the virtual memory manager 110 reserves an amount of the memory 202, to serve as the reserved memory 214, which corresponds to a number of portions of the content 206. In particular, the amount corresponds to a number of portions that is less than an entirety of the content 206. The virtual memory manager 110 may reserve the amount of memory 202 based on a variety of factors, such as current usage of memory, predefined settings specifying the amount (e.g., for the type of content, in connection with the particular application 108, and so on), historical memory usage data, and so forth. In the illustrated example, data corresponding to portion 1 of the content 206 is depicted written into the memory 202. This may represent a scenario in which an instruction of the content operation algorithm 204 is carried out to modify this data, but not yet the data of other portions of the content 206. FIGS. 3A-3F illustrate an example of the scenario in which instructions of the content operation algorithm 204 are carried out to modify multiple portions of the content 206's data in the virtual memory 114.

In particular, FIGS. 3A-3F depict an example implementation 300 in which memory use is constrained in connection with performing an operation that overlaps multiple portions of content data loaded in virtual memory. Each of these figures depict the virtual memory 114, the memory 202, the content 206, the reserved memory 214, and the remaining portions 216 of the memory 202.

Figure 3A:
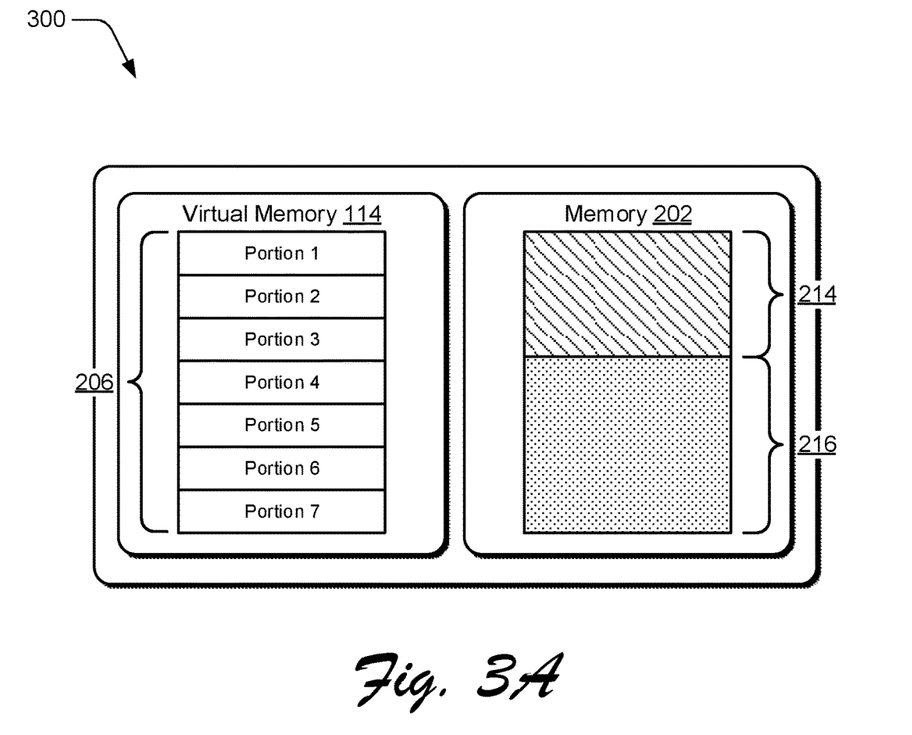
FIGS. 3A-3F depicts an example implementation in which memory use is constrained in connection with performing an operation that overlaps multiple portions of content data loaded in virtual memory.

FIG. 3A depicts a stage of the example implementation 300 in which no data of the content 206 is in the memory 202 for processing. This stage may occur after the virtual memory manager 110 issues a command to reserve an amount of the memory for the content operation algorithm 204—to designate the reserved memory 214. Alternately or in addition, this stage may occur before any data of the content 206 is written to the memory 202 for the modification. Accordingly, the reserved memory 214 is depicted as being empty.

Figure 3B:
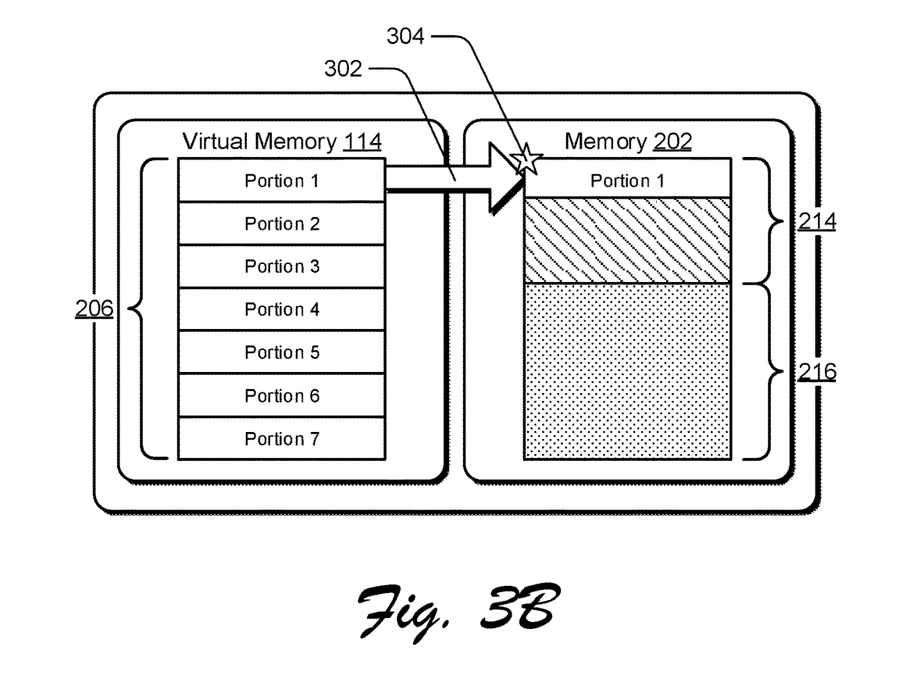

FIG. 3B depicts a stage of the example implementation 300 in which a first portion of the content 206's data (portion 1) is written 302 into the reserved memory 214. To achieve this, the virtual memory manager 110 issues a read command to read portion 1 of the content 206's data from the virtual memory 114 and also issues a write command to write 302 portion 1 to the memory 202. FIG. 3B also includes operation indication 304, which is depicted as a 5-pointed star. In general, the operation indication 304 indicates a specific fragment of the data written to the reserved memory 214 relative to which the content operation algorithm 204 is being carried out. In the case of FIG. 3B, the operation indication 304 indicates that the content operation algorithm 204 is being applied to a fragment of portion 1 in the reserved memory 214. Considering again the example in which the content 206 is an image, the fragment may correspond to a pixel. In this example, the operation indication 304 thus indicates the pixel of the image to which the content operation algorithm 204 is currently being applied.

Figure 3C:
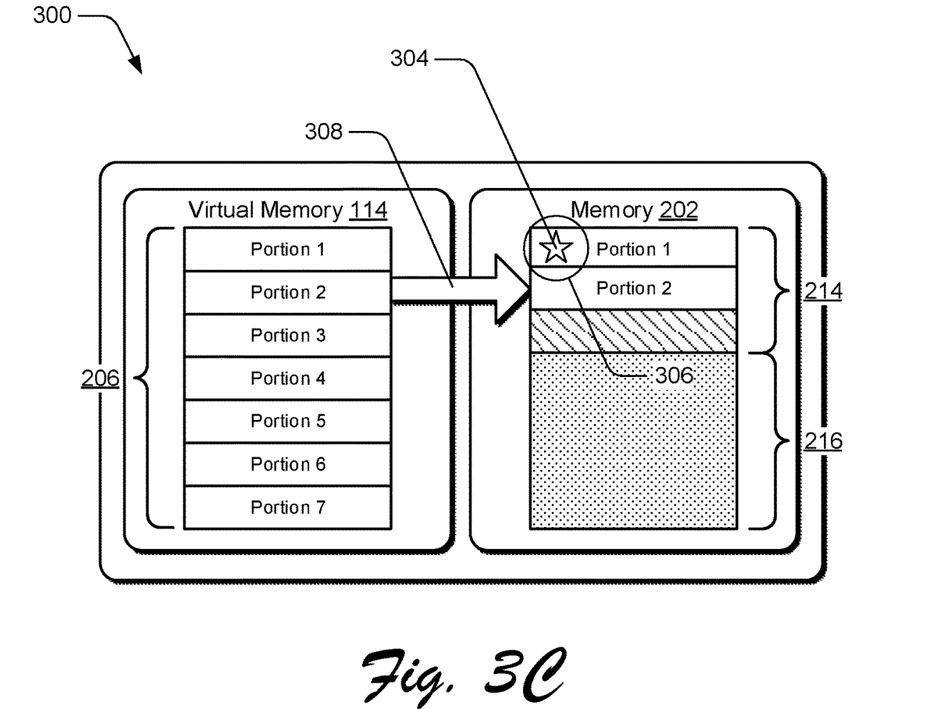

FIG. 3C depicts a stage of the example implementation 300 in which the content operation algorithm 204 affects multiple portions of the content 206's data.

In addition to the operation indication 304, FIG. 3C includes affected data indication 306. The affected data indication 306 indicates data that is affected by the content operation algorithm 204 when applied to the fragment indicated by the operation indication 304. Examples of other data that can be affected by a content operation algorithm when applied to a specific fragment include pixels of an image other than a current pixel under consideration (e.g., in connection with an image blurring algorithm), preceding and subsequent frames of a video other than a current frame under consideration (e.g., in connection with a video compression algorithm), and so on.

In the stage illustrated by FIG. 3C, the affected data indication 306 indicates that data of the content 206's portion 2 is affected by the content operation algorithm 204 when applied to the illustrated data fragment of portion 1. Based on this, portion 2 of the content 206's data is written 308 to the reserved memory 214. To achieve this, the virtual memory manager 110 issues a read command to read portion 2 from the virtual memory 114 and also issues a write command to write 308 portion 2 to the memory 202. The virtual memory manager 110 may issue these commands responsive to the virtual memory request 208 indicating an instruction to modify the data of portion 2. In other words, the virtual memory manager 110 may cause portion 2 to be written 308 to the memory 202 when the content operation algorithm 204 indicates that the corresponding data is needed to carry out the respective operation.

Figure 3D:
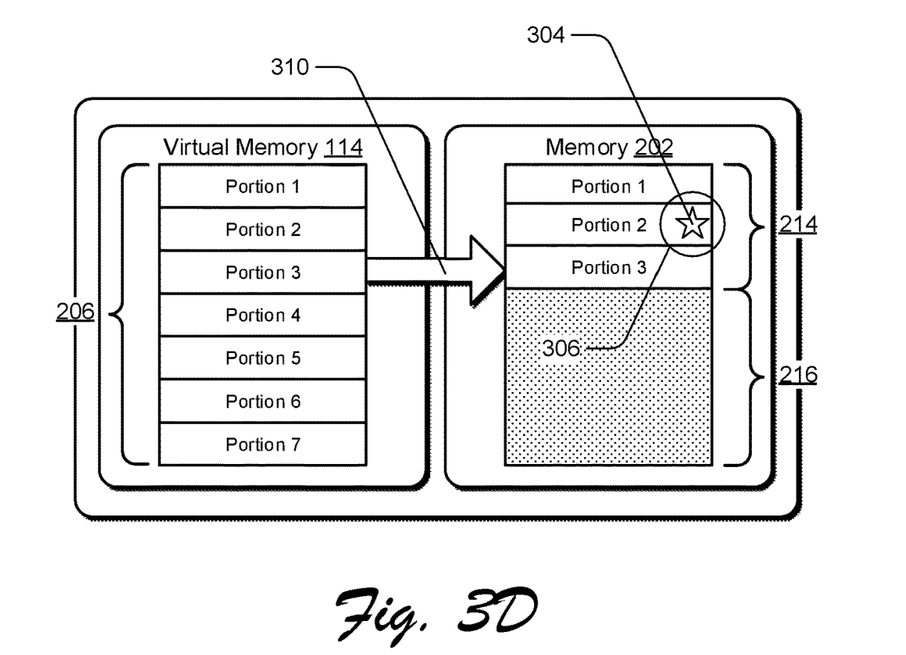

FIG. 3D depicts another stage of the example implementation 300 in which the content operation algorithm 204 affects multiple portions of the content 206's data.

In the stage illustrated by FIG. 3D, however, the operation indication 304 indicates that the content operation algorithm 204 is being applied to a data fragment of portion 2. The affected data indication 306 indicates that data of the content 206's portion 1 and portion 3 are affected by the content operation algorithm 204 when applied to the illustrated data fragment of portion 2. Accordingly, portion 3 of the content 206's data is written 310 to the reserved memory 214. To achieve this, the virtual memory manager 110 issues a read command to read portion 3 from the virtual memory 114 and also issues a write command to write 310 portion 3 to the memory 202. The virtual memory manager 110 may issue these commands responsive to the virtual memory request 208 indicating an instruction to modify the data of portion 3.

Figure 3E:
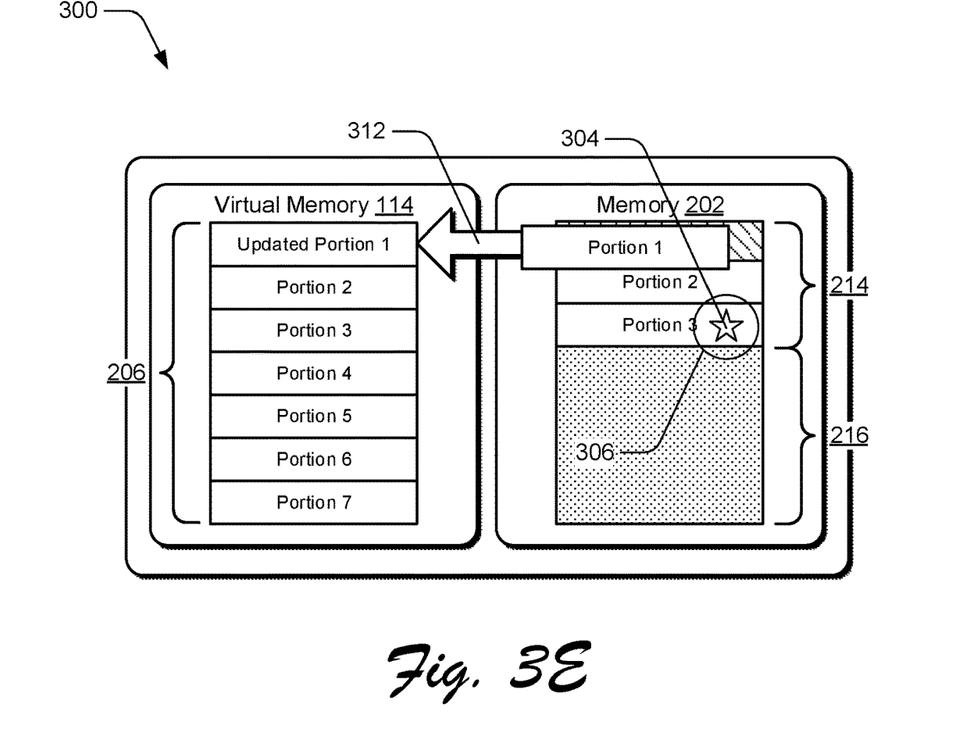

FIG. 3E depicts a further stage of the example implementation 300 in which the content operation algorithm 204 affects multiple portions of the content 206's data.

In the stage illustrated by FIG. 3E, the operation indication 304 indicates that the content operation algorithm 204 is being applied to a data fragment of portion 3. The affected data indication 306 indicates that data of portion 2 is affected by the content operation algorithm 204 when applied to the illustrated fragment of portion 3. The affected data indication 306 also indicates that the content 206's data beyond portion 3 is affected. In the illustrated example, this further affected portion corresponds to the content 206's portion 4 of data. In contrast to the previous stages, however, FIG. 3E represents a stage where the reserved memory 214 is full. In the example implementation 300, the reserved memory 214 has a size corresponding to three portions of the content 206's data. Thus, in order to modify the data of portion 4 according to the described techniques, portion 4 is swapped with one of the portions already in the reserved memory 214. In other words, portion 4 is not simply written to the memory 202—as doing so would cause an amount of data to be written to the memory 202 that exceeds a size of the memory 202 reserved for the content operation algorithm 204.

Rather than simply adding portion 4 to the memory 202 for processing, in the example implementation 300 portion 4 is swapped into the reserved memory 214 with portion 1. To achieve this, the virtual memory manager 110 initially transfers 312 portion 1 back to the virtual memory 114, and then transfers 314 portion 4 to the reserved memory 214. The transfer 314 of portion 4 to the reserved memory 214 is illustrated and described in relation to FIG. 3F. With reference to transferring portion 1 back to the virtual memory 114, the virtual memory manager 110 issues a read command to read portion 1 from the reserved memory 214 and also issues a write command to write 312 portion 1 to the virtual memory 114. As read from the memory 202, portion 1 includes the modifications indicated in the previous stages. Accordingly, when portion 1 is written 312 to the virtual memory 114, portion 1 includes any modifications that were made to it while in the reserved memory 214. Writing portion 1 back to the virtual memory 114 is thus effective to save the changes made to portion 1 while in the reserved memory 214. Accordingly, FIGS. 3E and 3F indicate that portion 1, as written back to the virtual memory 114, corresponds to updated portion 1. It is to be appreciated that portion 1 may be written to the memory 202 again while carrying out the content operation algorithm 204. Indeed, particular data portions of the content 206 may be written to the reserved memory 214 (and back to the virtual memory 114) once while carrying out the content operation algorithm 204, multiple times, or even no times—depending on the content operation algorithm 204—without departing from the spirit or scope of the described techniques.

Figure 3F:
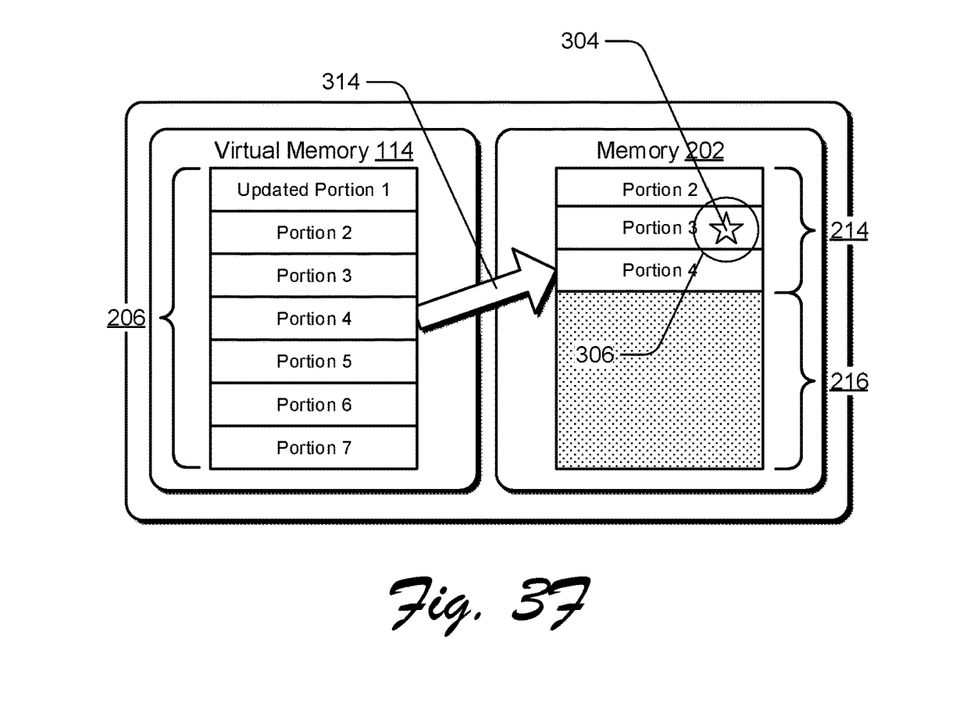

FIG. 3F depicts a stage of the example implementation 300 in which a swap is completed of a portion of data in the virtual memory 114 with a portion of data in the reserved memory 214. In particular, FIG. 3F represents a stage at which portion 4 of the content 206's data is written 314 to the reserved memory 214 to replace portion 1. To achieve this, the virtual memory manager 110 issues a read command to read portion 4 from the virtual memory 114 and also issues a write command to write 314 portion 4 to the memory 202.

It is to be appreciated that the virtual memory manager 110 may partition content into different numbers of partitions without departing from the spirit or scope of the described techniques. The virtual memory manager 110 may also reserve different amounts of the memory for the content operation algorithm without departing from the spirit or scope of the described techniques. Further, an order with which data portions of the content 206 are transferred between the virtual memory 114 and the memory is dependent upon the content operation algorithm 204. In any case, the content operation algorithm 204 at some point during processing overlaps multiple portions of the content 206's data.

Having discussed example details of the techniques for constraining memory use for overlapping virtual memory operations, consider now some example procedures to illustrate additional aspects of the techniques.

Example Procedures

This section describes example procedures for constraining memory use for overlapping virtual memory operations in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures are performed by a suitably configured device, such as the computing device 102 of FIG. 1 having a content processing system 104 that makes use of a virtual memory manager 110 or one implemented as the example system 200 of FIG. 2, which also make use of that module.

Figure 4:
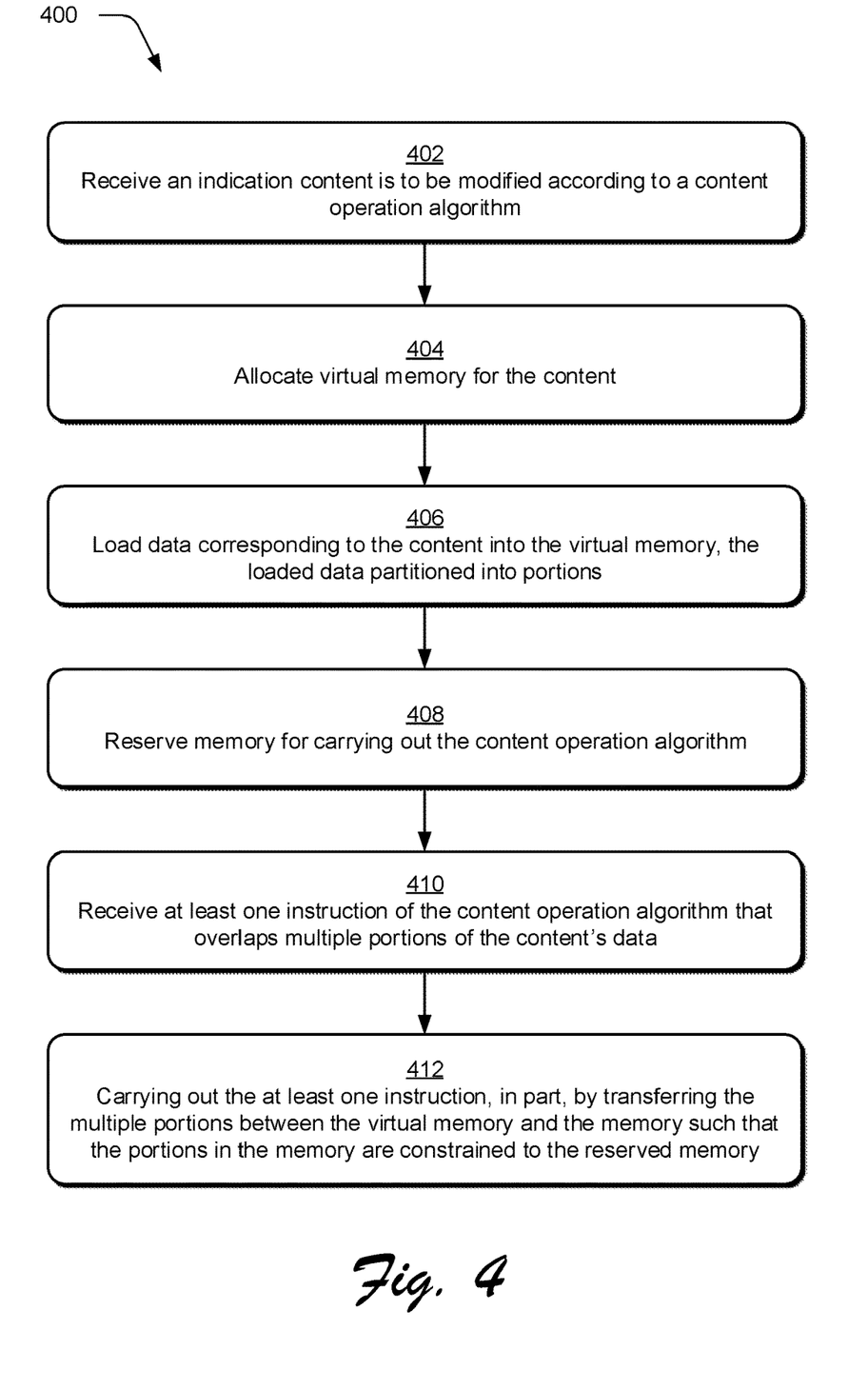
FIG. 4 depicts a procedure in an example implementation in which an operation is carried out on content data loaded in virtual memory and in which the operation overlaps multiple portions of the content data.

FIG. 4 depicts an example procedure 400 in which an operation is carried out on content loaded in virtual memory and in which the operation overlaps multiple data portions of the content. An indication is received that indicates content is to be modified according to a content operation algorithm (block 402). By way of example, the virtual memory manager 110 receives an indication from one of the applications 108 that an item of the digital content 116 is to be modified according to the content operation algorithm 204. In the following discussion, the digital content 116 indicated corresponds to the content 206.

Virtual memory is allocated for the content (block 404). By way of example, the virtual memory manager 110 allocates the virtual memory 114 for the content 206. In one or more implementations, a size of the virtual memory 114 allocated corresponds to a size (e.g., in bytes) of the content 206.

Data corresponding to the content is loaded into the virtual memory (block 406). In accordance with the principles discussed herein, the loaded data is partitioned into multiple portions. By way of example, the virtual memory manager 110 loads the content 206's data into the virtual memory 114 allocated at block 604. Further, the virtual memory manager 110 partitions the content 206's data that is loaded into the virtual memory 114 into multiple portions. In one or more implementations, the virtual memory manager 110 partitions the content 206's data so that a size of each partition is no larger than a predetermined size, e.g., 20 megabytes. The predetermined size may be based on any of a variety of factors, such as configuration settings (e.g., of the application 108), current memory usage, historical memory usage data, and so on. Further, the content 206's data may be partitioned such that each portion of the data has a same size (e.g., the predetermined size) except for one portion of the data—this one portion corresponding to a remainder of the content 206's data once the other content data portions are formed.

Memory is reserved for carrying out the content operation algorithm (block 408). In accordance with the principles discussed herein, a portion of the memory is reserved. In one or more implementations, the portion of memory reserved has a size corresponding to a multiple of the size of the data portions into which the content is partitioned. By way of example, the virtual memory manager 110 reserves at least some of the memory 202 for the content operation algorithm 204. The reserved memory 214 represents the portion of the memory 202 that the virtual memory manager 110 reserves for carrying out the content operation algorithm 204. In accordance with the described techniques, the virtual memory manager 110 reserves an amount of the memory 202 that corresponds to a multiple of a size of the content 206's data portions. In general, the number of data portions worth of memory reserved is less than the number of portions into which the content 206 is partitioned. With reference to FIGS. 3A-3F, the virtual memory manager 110 reserves three portions worth of the memory 202 for carrying out the content operation algorithm 204. If it is assumed that each portion of the content 206 in the virtual memory 114 is 20 megabytes, then the reserved memory in this example has a size of 60 megabytes. Certainly, the virtual memory manager 110 may reserve a different number of portions-worth of the memory 202 to carry out the content operation algorithm 204 without departing from the spirit or scope of the techniques described herein.

At least one instruction of the content operation algorithm is received that overlaps multiple portions of the content's data (block 410). By way of example, the virtual memory manager 110 receives the virtual memory request 208, which, in this example, corresponds to at least one instruction that overlaps multiple portions of the content 206's data. An example of such an instruction is one that affects portions 1-3 of the content 206. As noted above, example instructions that may overlap multiple portions of the content 206's data include, but are not limited to, instructions associated with video compression which consider preceding and subsequent video frames of a current reference frame, instructions associated with image modification (e.g., blurring) which consider neighboring pixels of a current reference pixel, and so forth.

The at least one instruction is carried out, in part, by transferring the multiple portions between the virtual memory and the memory such that the portions in the memory are constrained to the reserved memory (block 412). By way of example, the instruction received at 410 is carried out, in part, by the virtual memory manager 110 transferring portions of the content 206's data from the virtual memory 114 to the memory 202. In particular, the virtual memory manager 110 transfers these portions of content data to the reserved memory 214. The virtual memory manager 110 does not transfer these portions of content data to the remaining portions 216 of the memory 202, however. In scenarios where writing a portion of the content 206's data will cause an amount of data written to the memory 202 to exceed the reserved memory 214, the portion to be written is swapped with a portion already in the memory 202. In this way, the content data portions modified according to the content operation algorithm 204 are constrained to the reserved memory 214—and the amount of memory reserved for the content operation algorithm is not exceeded. This is effective to keep the memory 202 from exceeding an operating threshold and from causing applications and processes to crash.

Figure 5:
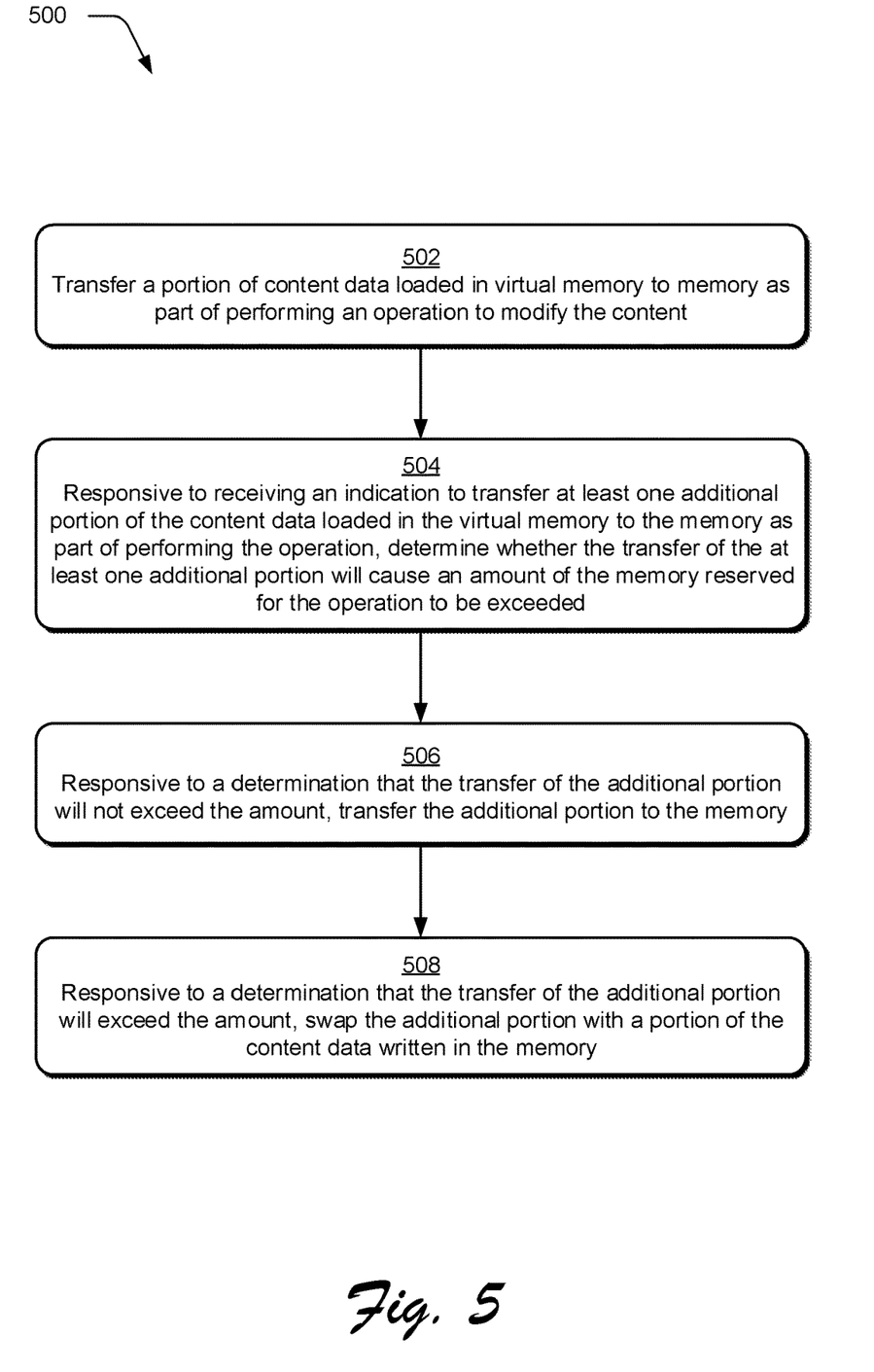
FIG. 5 depicts a procedure in an example implementation in which portions of content data are transferred to reserved memory in connection with carrying out an operation to modify the content.

FIG. 5 depicts an example procedure 500 in which portions of content data are transferred to reserved memory in connection with carrying out an operation to modify the content. A portion of content data loaded into virtual memory is transferred to memory as part of performing an operation to modify the content (block 502). By way of example, the virtual memory manager 110 reads portion 1 of the content 206's data from the virtual memory 114 and writes portion 1 to the memory 202—the reserved memory 214—as depicted in FIG. 3B. The virtual memory manager 110 makes this transfer to carry out the content operation algorithm 204, which when carried out is effective to modify the content 206.

An indication is received to transfer at least one additional portion of the content data that is loaded into the virtual memory to the memory as part of performing the operation. Responsive to this, a determination is made regarding whether the transfer of the additional portion will cause an amount of the memory reserved for the operation to be exceeded (block 504). By way of example, the virtual memory manager 110 receives an indication to transfer at least one additional portion of the content 206's data (e.g., one or more of portions 2-7) that is loaded into the virtual memory 114. This indication is received as part of carrying out the content operation algorithm 204. Responsive to this, the virtual memory manager 110 determines whether transfer of this additional portion will cause an amount of the memory 202 that is reserved for the operation to be exceeded.

Responsive to a determination that the transfer of the additional portion will not exceed the amount of memory, the additional portion is transferred to the memory (block 506). By way of example, the virtual memory manager 110 determines that the transfer of the additional portion of the content 206's data will not exceed the amount of memory reserved for the operation. Responsive to this determination, the virtual memory manager 110 reads the additional portion of the content 206's data from the virtual memory 114 and writes the additional portion to the memory 202—specifically the reserved memory 214. Examples of such transfers are depicted in FIGS. 3C and 3D, which involve transferring portion 2 and portion 3 of the content 206's data to the reserved memory 214.

Responsive to a determination that the transfer of the additional portion will exceed the amount of memory, the additional portion is swapped with a portion of the content data written in the memory (block 508). In contrast to the determination made at block 506, for instance, the virtual memory manager 110 determines that the transfer of the additional portion of the content 206's data will exceed the amount of memory reserved for the operation. Responsive to his determination, the virtual memory manager 110 swaps the additional portion of data in the virtual memory 114 with a portion of the data in the reserved memory 214. An example of this scenario is illustrated and described in reference to FIGS. 3E and 3F.

Having described example procedures in accordance with one or more implementations, consider now an example system and device that can be utilized to implement the various techniques described herein.

Example System and Device

Figure 6:
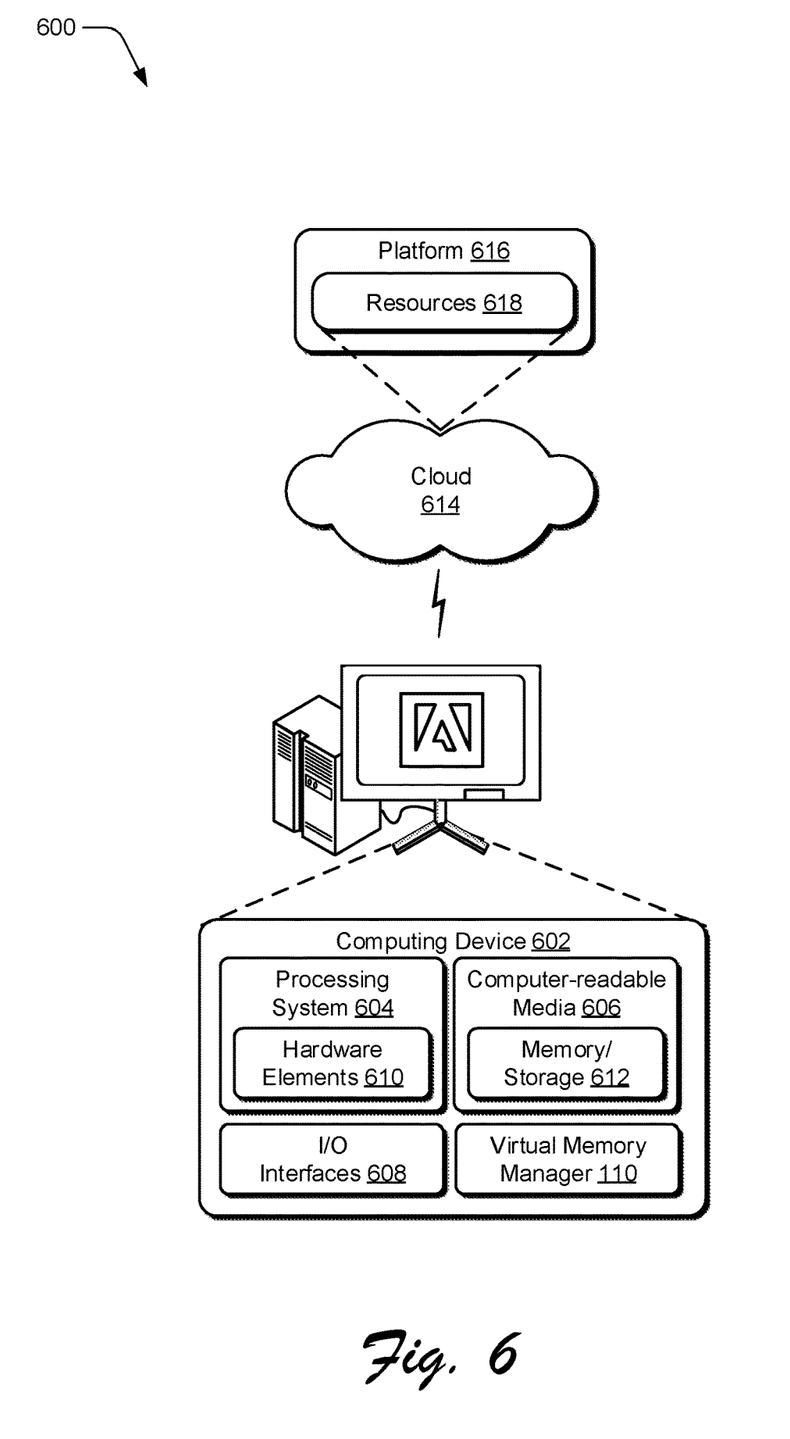
FIG. 6 illustrates an example system including various components of an example device that can be implemented as any type of computing device as described and/or utilized with reference to FIGS. 1-5 to implement embodiments of the techniques described herein.

FIG. 6 illustrates an example system generally at 600 that includes an example computing device 602 that is representative of one or more computing systems and/or devices that may implement the various techniques described herein. This is illustrated through inclusion of the virtual memory manager 110. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below. Although not shown, the various configurations may include a housing or housings of the computing device 602. The housing may have a variety of form factors depending on the configuration of the computing device 602. When configured as a mobile phone for instance, the computing device 602 includes a housing having a form factor of a mobile phone. The computing device 602 may include housing having form factors of other configurations, such as tablets, wrist watches, computing glasses, laptop computers, desktop computers, server computers, and so forth.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources and functions to connect the computing device 602 with other computing devices. The platform 616 may also serve to abstract scaling of resources to provide a corresponding level of scale to encountered demand for the resources 618 that are implemented via the platform 616. Accordingly, in an interconnected device embodiment, implementation of functionality described herein may be distributed throughout the system 600. For example, the functionality may be implemented in part on the computing device 602 as well as via the platform 616 that abstracts the functionality of the cloud 614.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to prevent memory use from exceeding an operational threshold, a method implemented by at least one computing device, the method comprising:
    allocating, by the at least one computing device, virtual memory for content that is to be modified according to a content operation algorithm having a plurality of instructions that when performed apply a respective content operation to the content;
    loading, by the at least one computing device, data of the content into the virtual memory, the loaded data partitioned into portions and the content operation algorithm carried out in relation to a plurality of the portions;
    reserving, by the at least one computing device, at least some of a heap memory for carrying out the content operation algorithm, the reserved heap memory is a portion of the heap memory and a size of the reserved heap memory is less than a size of the loaded data;
    receiving, by the at least one computing device, at least one instruction of the plurality of instructions as part of carrying out the content operation algorithm, the at least one instruction affecting at least two of the portions corresponding to the content that is to be modified; and
    performing, by the at least one computing device, the at least one instruction, in part, by:
        reading, from the reserved heap memory, a modified portion of the plurality of portions, the modified portion modified by performing at least one other instruction of the plurality of instructions;
        writing the modified portion to the virtual memory; and
        transferring the at least two portions between the virtual memory and the heap memory such that portions in the heap memory are constrained to the reserved heap memory.

2. The method as described in claim 1, wherein the size of the reserved heap memory corresponds to a multiple of a portion size of the portions.

3. The method as described in claim 1, further comprising:
    determining that transfer of a portion of the plurality of portions to the heap memory will not exceed the reserved heap memory; and
    responsive to the determining:
        reading the portion from the virtual memory; and
        writing the portion to the reserved heap memory.

4. The method as described in claim 1, further comprising:
determining that transfer of a first portion of the plurality of portions to the heap memory will exceed the reserved heap memory; and
responsive to the determining:
reading, from the reserved heap memory, a second portion of the plurality of portions;
writing the second portion to the virtual memory;
reading the first portion from the virtual memory; and
writing the first portion to the reserved heap memory.

5. The method as described in claim 4, wherein writing the second portion to the virtual memory is effective to save modifications made to the second portion while in the reserved heap memory and according to the content operation algorithm.

6. The method as described in claim 1, wherein the heap memory comprises physical memory.

7. The method as described in claim 6, wherein the physical memory comprises random-access memory (RAM).

8. The method as described in claim 1, further comprising partitioning the data of the content into the portions.

9. The method as described in claim 1, wherein the content includes digital audio content.

10. The method as described in claim 1, wherein the content includes digital video content and the at least one instruction is an instruction to apply video compression to a reference frame of the digital video content.

11. A system comprising:
a plurality of physical devices having storage for aggregation as virtual memory;
at least one processor; and
computer readable media having stored thereon instructions that are executable by the at least one processor to implement a virtual memory manager to perform operations comprising:
loading, into an allocated portion of the virtual memory, data of content that is to be modified according to a content operation algorithm carried out in relation to a plurality of portions of the loaded data; and
carrying out the content operation algorithm, in part, by:
reading, from a portion of a heap memory reserved for the content operation algorithm, a modified portion of the plurality of portions, the reserved portion of the heap memory has a size that is less than a size of the loaded data;
writing the modified portion to the allocated portion of the virtual memory; and
transferring at least two of the portions of the loaded data between the allocated portion of the virtual memory and the reserved portion of the heap memory such that the at least two portions transferred are constrained to the reserved portion of the heap memory, the at least two portions corresponding to the content that is to be modified.

12. The system as described in claim 11, wherein carrying out the content operation algorithm includes transferring the plurality of portions between the allocated virtual memory and the reserved portion of the heap memory such that the plurality of portions are constrained to the reserved portion of the heap memory.

13. The system as described in claim 11, further comprising a housing having a form factor of a mobile phone.

14. The system as described in claim 11, further comprising a housing having a form factor of a tablet device.

15. The system as described in claim 11, wherein the operations further comprise:
allocating the portion of the virtual memory to the content that is to be modified; and
partitioning the data of the content into the portions.

16. The system as described in claim 11, wherein the operations further comprise determining whether transfer of a portion of the loaded data to the reserved portion of the heap memory will exceed the reserved portion of the heap memory, the transfer of the portion of loaded data between the allocated virtual memory and the reserved portion of the heap memory being based on the determining.

17. The system as described in claim 16, wherein the transfer comprises writing the portion of loaded data to the reserved portion of the heap memory based on the determining.

18. The system as described in claim 16, wherein the transfer comprises swapping the portion of loaded data with a different portion of the data in the reserved portion of the heap memory based on the determining.

19. In a digital medium environment to prevent memory use from exceeding an operational threshold, a method implemented by at least one computing device, the method comprising:
receiving, by the at least one computing device, a request to perform a modification operation on content, the modification operation implemented according to an algorithm having a plurality of instructions;
loading, by the at least one computing device, data of the content into virtual memory allocated to the content, the loaded data being partitioned into portions and the content operation algorithm carried out in relation to a plurality of the portions;
reading, by the at least one computing device from a portion of a heap memory reserved for the modification operation, a modified portion of the plurality of portions, the portion of the heap memory having a size that is less than a size of the loaded data;
writing, by the at least one computing device, the modified portion to the virtual memory allocated to the content; and
modifying, by the at least one computing device, the content according to the modification operation by carrying out the instructions of the content operation algorithm, including carrying out at least one instruction of the plurality of instructions that affects at least two of the portions corresponding to the content that the modification operation is to be performed on, the at least one instruction carried out, in part, by transferring the at least two portions between the virtual memory and the heap memory such that a number of the portions of the data in the heap memory is constrained to the portion of the heap memory.

20. The method as described in claim 19, wherein the content includes digital image content and the at least one instruction applies a blurring filter in relation to a pixel of a digital image.

* * * * *